(12) United States Patent
Paukner et al.

(10) Patent No.: US 11,274,590 B2
(45) Date of Patent: Mar. 15, 2022

(54) SYSTEM AND METHOD FOR EXHAUST GAS AFTERTREATMENT OF AN INTERNAL COMBUSTION ENGINE

(71) Applicant: VOLKSWAGEN AKTIENGESELLSCHAFT, Wolfsburg (DE)

(72) Inventors: Stefan Paukner, Wolfsburg (DE); Falk-Christian Baron Von Ceumern-Lindenstjerna, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/629,795

(22) PCT Filed: Jul. 9, 2018

(86) PCT No.: PCT/EP2018/068509
§ 371 (c)(1),
(2) Date: Jan. 9, 2020

(87) PCT Pub. No.: WO2019/011842
PCT Pub. Date: Jan. 17, 2019

(65) Prior Publication Data
US 2021/0079827 A1    Mar. 18, 2021

(30) Foreign Application Priority Data

Jul. 10, 2017   (DE) ..................... 10 2017 115 408.6

(51) Int. Cl.
*F01N 9/00*   (2006.01)
*F01N 3/00*   (2006.01)
(Continued)

(52) U.S. Cl.
CPC ........... *F01N 9/002* (2013.01); *F01N 13/009* (2014.06); *F01N 3/101* (2013.01); *F01N 2430/06* (2013.01);
(Continued)

(58) Field of Classification Search
CPC .... F01N 9/002; F01N 13/009; F01N 2430/06; F01N 2560/025; F01N 3/101; F01N 2900/1602
See application file for complete search history.

(56) References Cited

U.S. PATENT DOCUMENTS 5,497,617 A    3/1996  Bagley et al.
5,711,149 A    1/1998  Araki
(Continued)

FOREIGN PATENT DOCUMENTS

CN    101158302 A    4/2008
CN    101617106 A    12/2009
(Continued)

OTHER PUBLICATIONS

International Search Report of PCT Application No. PCT/EP2018/068509, dated Sep. 11, 2018.
(Continued)

*Primary Examiner* — Matthew T Largi
(74) *Attorney, Agent, or Firm* — Pearl Cohen Zedek Latzer Baratz LLP

(57) ABSTRACT

The invention relates to an exhaust gas aftertreatment system for an internal combustion engine (10), in particular for an internal combustion engine (10) which is charged by means of a turbocharger (30) and spark-ignited by means of spark plugs (16). A particulate filter (24) and an electrically heatable three-way catalytic converter (26) downstream of the particulate filter (24) are arranged in a position close to the engine in an exhaust gas system (20) connected to an
(Continued)

outlet (12) of the internal combustion engine (10). A further three-way catalytic converter (28) is arranged in the underbody position of the motor vehicle downstream of the electrically heatable catalytic converter (26). According to the invention, the electrically heatable three-way catalytic converter (26) is heated electrically after engine start, and the particulate filter (24), the electrically heatable three-way catalytic converter (26) and the further three-way catalytic converter are additionally heated by the exhaust gas flow from the internal combustion engine (10). The electric heating of the electrically heatable three-way catalytic converter (26) is switched off when the electrically heatable three-way catalytic converter (26) has reached its light-off temperature.

8 Claims, 2 Drawing Sheets

(51) Int. Cl.
  *F01N 13/00* (2010.01)
  *F01N 3/10* (2006.01)
(52) U.S. Cl.
  CPC ..... *F01N 2560/025* (2013.01); *F01N 2900/1602* (2013.01)

(56) References Cited

U.S. PATENT DOCUMENTS

| | | | |
|---|---|---|---|
| 8,464,522 B2 * | 6/2013 | Fujiwara | F02D 41/029 60/295 |
| 8,899,027 B2 | 12/2014 | Roos et al. | |
| 2008/0028753 A1 | 2/2008 | Wagner et al. | |
| 2010/0011749 A1 * | 1/2010 | Fujiwara | F01N 3/106 60/286 |
| 2010/0037607 A1 | 2/2010 | Doering | |
| 2010/0192549 A1 | 8/2010 | Gonze et al. | |
| 2010/0290957 A1 | 11/2010 | Yoshida et al. | |
| 2010/0313547 A1 | 12/2010 | Gonze et al. | |
| 2011/0072788 A1 | 3/2011 | Ruona et al. | |
| 2011/0073088 A1 | 3/2011 | Hubbard et al. | |
| 2011/0131950 A1 * | 6/2011 | Parnin | F01N 9/002 60/274 |
| 2011/0131954 A1 * | 6/2011 | Parnin | F01N 3/027 60/276 |
| 2011/0167802 A1 | 7/2011 | Brueck | |
| 2012/0060471 A1 | 3/2012 | Gonze et al. | |
| 2012/0159931 A1 | 6/2012 | Bressler et al. | |
| 2012/0247086 A1 | 10/2012 | Gonze et al. | |
| 2013/0111886 A1 | 5/2013 | Gonze et al. | |
| 2013/0192202 A1 | 8/2013 | Lambert et al. | |
| 2013/0239554 A1 | 9/2013 | Gonze et al. | |
| 2013/0255227 A1 * | 10/2013 | Gonze | F01N 3/22 60/274 |
| 2014/0041367 A1 | 2/2014 | Balthes et al. | |
| 2015/0087497 A1 * | 3/2015 | Chiffey | F01N 3/10 502/1 |
| 2015/0132205 A1 | 5/2015 | Rothe et al. | |
| 2015/0158016 A1 | 6/2015 | Mori et al. | |
| 2015/0337703 A1 | 11/2015 | Zhang et al. | |
| 2016/0251989 A1 | 9/2016 | Upadhyay | |
| 2016/0281565 A1 | 9/2016 | Nishioka et al. | |
| 2016/0356200 A1 | 12/2016 | Bressler et al. | |
| 2017/0276053 A1 * | 9/2017 | Robel | B01D 53/9477 |
| 2018/0291784 A1 * | 10/2018 | Achenback | F01N 13/0093 |
| 2018/0334972 A1 | 11/2018 | Paukner | |
| 2020/0271067 A1 * | 8/2020 | Lee | B01D 53/9422 |

FOREIGN PATENT DOCUMENTS

| | | | |
|---|---|---|---|
| CN | 101676528 A | 3/2010 | |
| CN | 101825008 A | 9/2010 | |
| CN | 101922330 A | 12/2010 | |
| CN | 102444456 A | 5/2012 | |
| CN | 103089380 A | 5/2013 | |
| CN | 103225531 A | 8/2013 | |
| CN | 203146084 U | 8/2013 | |
| CN | 103321723 A | 9/2013 | |
| CN | 103362605 A | 10/2013 | |
| CN | 203584520 U | 5/2014 | |
| CN | 104791053 A | 7/2015 | |
| CN | 105658919 A | 6/2016 | |
| CN | 106030063 A | 10/2016 | |
| CN | 106321204 A | 1/2017 | |
| CN | 106555640 A | 4/2017 | |
| CN | 106 762 040 A | 5/2017 | |
| DE | 10 2008 036 127 A1 | 2/2010 | |
| DE | 10 2010 046 747 A1 | 3/2011 | |
| DE | 10 2010 064 020 | 6/2012 | |
| DE | 10 2011 017 486 A1 | 10/2012 | |
| DE | 10 2012 204 779 A1 | 10/2012 | |
| DE | 10 2015 200 023 A1 | 7/2015 | |
| DE | 10 2015 212 514 A1 | 1/2017 | |
| DE | 10 2015 216 830 A1 | 3/2017 | |
| DE | 102017205664 A1 * | 10/2018 | F01N 3/101 |
| EP | 1158143 A2 | 11/2001 | |
| FR | 2 945 575 A1 | 11/2010 | |
| JP | 2001 280121 A | 10/2001 | |
| JP | 2010 048131 A | 3/2010 | |
| JP | 2013/119771 | 6/2013 | |
| WO | WO 2006/100051 A1 | 9/2006 | |
| WO | WO 2010/130909 A1 | 11/2010 | |
| WO | WO-2010130909 A1 * | 11/2010 | F01N 13/009 |

OTHER PUBLICATIONS

Search report for German Patent Application No. 10 2017 115 408.6, dated Feb. 22, 2018.
Office Action for Chinese Patent Application No. 201880046295.2, dated Feb. 19, 2021.

\* cited by examiner

SYSTEM AND METHOD FOR EXHAUST GAS AFTERTREATMENT OF AN INTERNAL COMBUSTION ENGINE

CROSS-REFERENCE TO RELATED APPLICATIONS

This application is a National Phase Application of PCT International Application No. PCT/EP2018/068509, International Filing Date Jul. 9, 2018, claiming priority of German Patent Application No. 10 2017 115 408.6, filed Jul. 10, 2017, which is hereby incorporated by reference.

FIELD OF THE INVENTION

The present invention relates to a system and method for the exhaust gas aftertreatment of an internal combustion engine in accordance with the definition of the species set forth in the independent claims.

BACKGROUND OF THE INVENTION

Rigorous demands are placed on vehicle manufacturers by the increased tightening of emission-control legislation. These are met by appropriate measures for reducing untreated engine emissions and by providing a suitable exhaust gas aftertreatment. With the introduction of the EU6 stage legislation for spark-ignition engines, a limit value for a particle count is required that, in many cases, necessitates the use of a gasoline particulate filter. Such soot particles form, in particular following a cold start of the internal combustion engine due to an incomplete combustion in combination with a leaner than stoichiometric air/fuel ratio, and due to cold cylinder walls during the cold start. The cold-start phase is, therefore, relevant to compliance with the legally required particulate matter limits. Such a gasoline particulate filter also becomes further saturated with soot during vehicle operation. Preventing a sharp increase in the exhaust gas back pressure requires continuously or periodically regenerating such a gasoline particulate filter. The rise in the exhaust back pressure can lead to an excess consumption by the internal combustion engine, a power loss, a degradation of running smoothness, and even to misfires. Thermally oxidizing the soot trapped in the gasoline particulate filter requires a high enough temperature level in conjunction with the simultaneous presence of oxygen in the exhaust system of the spark-ignition engine. Since today's spark-ignition engines are normally operated without excess oxygen at a stoichiometric air/fuel ratio of ($\lambda=1$), additional measures are needed. These include, for example, increasing the temperature by adjusting the ignition timing, temporarily adjusting the spark-ignition engine toward lean, injecting secondary air into the exhaust system, or a combination thereof. Until now, an ignition-timing retard has preferably been used in combination with a lean adjustment of the spark-ignition engine, since such a method does not require additional components, and a sufficient quantity of oxygen is able to be supplied in most operating points of the spark-ignition engine. Due to the good efficiencies of the spark-ignition engine, it is not possible to regenerate a particulate filter in the underbody position in certain operating situations, so that regenerating a particulate filter in the underbody position requires special driving cycles. A close-coupled, i.e., near to the engine, positioning of the particulate filter is beneficial since this results in higher exhaust gas temperatures at the particulate filter and facilitates the heating to a regeneration temperature. Another problem of three-way catalytic converters having a three way catalytically active coating, what are generally referred to as four-way catalytic converters, is the fact that the coating can exhibit pronounced ageing effects, so that converting the gaseous pollutants can require an additional three-way catalytic converter in a close-coupled position.

The German Patent Application DE 10 2008 036 127 A1 discusses a method for the exhaust gas aftertreatment of an internal combustion engine in whose exhaust duct are located a particulate filter and a three-way catalytic converter. As the first component of the exhaust gas aftertreatment, the particulate filter is thereby configured downstream of an exhaust of the internal combustion engine. A three-way catalytic converter is disposed downstream of the particulate filter. The oxygen content in the exhaust gas is thereby increased to regenerate the particulate filter by a lambda control of the three-way catalytic converter.

The German Patent Application DE 10 2010 046 747 A1 discusses an exhaust gas aftertreatment system for a spark-ignition engine, as well as an exhaust gas aftertreatment method. A particulate filter is thereby configured downstream of a three-way catalytic converter; to regenerate the soot particles trapped in the particulate filter, it being possible to provide a secondary air system that blows fresh air into the exhaust system downstream of the three-way catalytic converter and upstream of the particulate filter.

In addition, the German Patent Application DE 10 2012 204 779 A1 describes an exhaust gas aftertreatment system for an internal combustion engine, where an electrically heatable three-way catalytic converter and, downstream thereof, another three-way catalytic converter are located in an exhaust system. In this context, secondary air can be introduced into the exhaust system to reduce emissions.

SUMMARY OF THE INVENTION

It is an object of the present invention to ensure that a regeneration temperature of the particulate filter is reached in all driving cycles to improve the ageing behavior of the exhaust gas aftertreatment system, and to overcome the disadvantages known from the related art.

This objective is achieved in accordance with the present invention by an exhaust gas aftertreatment system for an internal combustion engine having an exhaust system that is coupled to an exhaust of the internal combustion engine, the exhaust system including an exhaust duct, in which are disposed in the flow direction of an exhaust gas of the internal combustion engine through the exhaust duct: a particulate filter, as the first emission-reducing component, in a close-coupled position; downstream thereof, likewise in a close-coupled position, an electrically heatable three-way catalytic converter; and downstream of the electrically heatable catalytic converter, another three-way catalytic converter. In this connection, a close-coupled configuration of the particulate filter and of the electrically heatable three-way catalytic converter is understood to be a configuration of the exhaust gas aftertreatment components having an exhaust gas flow length of less than 80 cm, in particular of less than 50 cm, especially of less than 35 cm from an exhaust of the internal combustion engine. This permits an accelerated heating of the particulate filter and of the electrically heatable three-way catalytic converter, in particular following a cold start of the internal combustion engine. Due to the close-coupled position of the particulate filter, less waste heat is lost via the walls of the exhaust duct, so that, in comparison to a particulate filter in the underbody position of the internal combustion engine; on the particulate filter, it is easier to reach an oxidation temperature of soot particles trapped in the particulate filter required to regenerate the particulate filter.

Advantageous improvements to and refinements of the exhaust gas aftertreatment system according to the present invention for an internal combustion engine are made possible by the features delineated in the dependent claims.

A preferred and advantageous specific embodiment of the present invention provides that the internal combustion engine have a secondary air system for introducing secondary air into the exhaust duct, a feed point of the secondary air system being located at the exhaust of the internal combustion engine or downstream thereof and upstream of the particulate filter. The secondary air is thereby injected into the hot exhaust ducts of the internal combustion engine, the unburned exhaust components reacting exothermally with the secondary air still in the exhaust duct and thus ensuring a heating of the exhaust gas. It is thus possible to further reduce the time it takes for the electrically heatable three-way catalytic converter to reach the light-off temperature thereof. In addition, the secondary air system may be utilized for regenerating the particulate filter and for introducing the oxygen required for the regeneration into the exhaust duct upstream of the particulate filter. The operating state of the internal combustion engine may thereby be suitably adapted in the case of a regeneration of the particulate filter, eliminating the need for operating the internal combustion engine at a leaner than stoichiometric air/fuel ratio to permit a regeneration of the particulate filter.

An advantageous enhancement of the present invention provides that the electrically heatable three-way catalytic converter include an electrical heating element, in particular an electrical heating disk, and a metallic substrate structure. An electrical heating element may be readily heated by an electrical heating resistor independently of the exhaust-gas flow from the internal combustion engine; a heating of the electrical heating element is also thereby possible when the internal combustion engine is switched off, in particular immediately before a start thereof. The metallic substrate element makes possible an especially efficient heat transfer, so that the heat produced in the electrical heating element may be transferred to the metallic substrate element without significant losses. Moreover, a metallic substrate structure permits a correspondingly thin-walled construction of the electrically heatable three-way catalytic converter, making it possible to reduce the flow resistance and thus the exhaust back pressure.

It is thereby especially preferred that a pin connection be used to attach the electrical heating element to the metallic substrate structure of the electrically heatable three-way catalytic converter. A pin connection allows the heating disk to be stably supported on the metallic substrate structure of the electrically heatable three-way catalytic converter, avoiding mechanical rigidity of the electrically heatable three-way catalytic converter, as well as vibrations caused by the use of a loose, vibrating heating disk.

Alternatively, an advantageous design variant of the present invention provides that the electrically heatable three-way catalytic converter have a directly electrically heatable substrate. A directly electrically heatable substrate generates the heat directly in the substrate, making it possible for the substrate to be heated, in particular following a cold start of the internal combustion engine, without any further heat transfer from the heating disk to the exhaust gas and from the exhaust gas to the catalytic converter.

A preferred specific embodiment of the present invention provides that a first lambda probe be disposed upstream of the particulate filter, and that a second lambda probe in the exhaust duct be disposed downstream of the electrically heatable catalytic converter and upstream of the further three-way catalytic converter. In this way, one lambda probe pair may be used to both perform the lambda control of the internal combustion engine, as well as the on-board diagnosis of the electrically heatable three-way catalytic converter since the uncoated particulate filter does not affect the lambda control. The first lambda probe is thereby preferably designed as a wide band lambda probe to make possible a quantitative statement about the oxygen content in the exhaust gas. The second lambda probe may be designed as a two-step lambda probe to reduce the costs and thus provide a qualitative statement about the excess oxygen in the exhaust gas.

An advantageous specific embodiment of the present invention provides that the particulate filter be uncoated and free of an oxygen accumulator. The particulate filter thereby lacks both a three-way catalytic coating, as well as a coating for the selective catalytic reduction of nitrogen oxides. It is thereby especially preferred that the particulate filter be designed to be essentially free of an oxygen accumulator and not have any oxygen storage capacity. In this way, an ageing-induced change in the properties of the particulate filter may be thereby prevented, so that the particulate filter has essentially the same performance characteristics over the service life thereof. Moreover, in this way, a shared lambda probe pair may thereby monitor the functioning of the particulate filter and of the electrically heatable three-way catalytic converter, the first lambda probe being disposed upstream of the particulate filter, and the second lambda probe downstream of the electrically heatable three-way catalytic converter. Since, as the first exhaust gas aftertreatment component, the particulate filter is disposed downstream of the exhaust of the internal combustion engine, high exhaust gas temperatures act thereon, in particular in a full-load operation of the internal combustion engine, which otherwise lead to an increased thermal ageing of a catalytic coating. Moreover, by omitting a coating, the particulate filter may be designed to have fewer cells, thereby reducing the thermal mass of the particulate filter and promoting a heating of the particulate filter. Moreover, the exhaust gas back pressure is additionally reduced, whereby the flow losses in the exhaust system may be reduced, and thus the power efficiency of the internal combustion engine enhanced. This may be utilized to achieve greater power output or a decreased consumption, even when working with otherwise unchanged boundary conditions.

In accordance with the present invention, a method for the exhaust gas aftertreatment of an internal combustion engine using an inventive exhaust gas aftertreatment system is provided that includes the following steps:

electrically heating the electrically heatable three-way catalytic converter to a light-off temperature of the electrically heatable three-way catalytic converter beginning from a start of the internal combustion engine;

heating the particulate filter, the electrically heatable three-way catalytic converter and the further three-way catalytic converter using the exhaust-gas flow from the internal combustion engine beginning from the start of the internal combustion engine; and regenerating the particulate filter; the particulate filter being heated to a regeneration temperature by the exhaust gas from the internal combustion engine.

A method according to the present invention makes it possible for at least one pollutant-reducing exhaust gas aftertreatment component, in particular the electrically heatable three-way catalytic converter, to be heated to a light-off temperature shortly after a cold start of the internal combustion engine, making it possible to efficiently convert the harmful gaseous exhaust components. Moreover, the durability of the catalytic coating may be enhanced since the electrically heatable three-way catalytic converter in a full-load operation of the internal combustion engine does not become as hot as the particulate filter disposed in the first position downstream of the exhaust.

A preferred specific embodiment of the exhaust gas aftertreatment method provides that secondary air be introduced into the exhaust-side cylinder head or into the exhaust duct downstream of the exhaust and upstream of the particulate filter in a heating phase of one of the three-way catalytic converters or of the particulate filter, to promote the heating of the catalytic converters or of the particulate filter by an exothermic reaction of unburned fuel components. Injecting secondary air may enhance the transfer of heat from the electrical heating element of the electrically heatable three-way catalytic converter to the substrate element, and prevent electrical heating element-induced local overheating since the generated heat is convectively transferred by the secondary air to the rest of the catalytic converter.

Unless indicated otherwise in the individual case, the various specific embodiments of the present invention mentioned in this Application may be advantageously combined with one another.

BRIEF DESCRIPTION OF THE DRAWINGS

The present invention will be explained in the following in exemplary embodiments with reference to the accompanying drawings. The same reference numerals in the various figures thereby denote identical components or components having the same function, where.

DETAILED DESCRIPTION OF THE INVENTION

Figure 1:
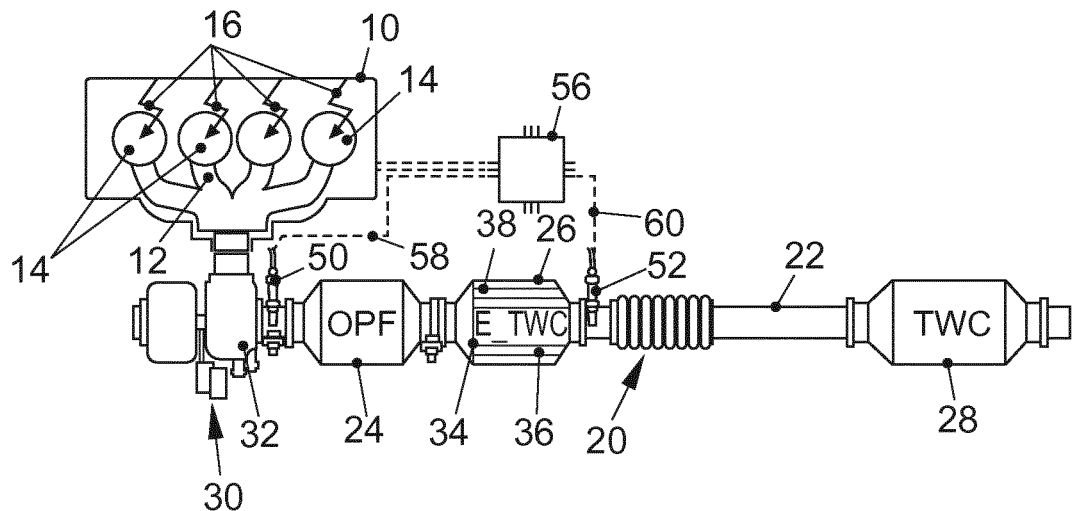
FIG. 1 shows a first exemplary embodiment of an internal combustion engine having an exhaust gas aftertreatment system according to the present invention.

FIG. 1 is a schematic representation of an internal combustion engine 10 whose exhaust 12 is coupled to an exhaust system 20. Internal combustion engine 10 is a spark ignition engine that is spark ignited by spark plugs 16 and has a plurality of combustion chambers 14. Internal combustion engine 10 is preferably designed to be charged by an exhaust-gas turbocharger 30, a turbine 32 of exhaust-gas turbocharger 30 being configured downstream of exhaust 12 and upstream of the first emission-reducing exhaust gas aftertreatment component, in particular upstream of a particulate filter 24. Exhaust system 20 includes an exhaust duct 22, in which are disposed in the direction of flow of an exhaust gas through exhaust duct 22: a particulate filter 24; downstream thereof, an electrically heatable three-way catalytic converter 26; and, further downstream, another three-way catalytic converter 28. Particulate filter 24 and electrically heatable three-way catalytic converter 26 are preferably each in a close coupled position, i.e., disposed at a distance of less than 80 cm exhaust gas flow length, in particular of less than 50 cm exhaust gas flow length from exhaust 12 of internal combustion engine 10. Other three-way catalytic converter 28 is preferably disposed in the underbody position of a motor vehicle and thus in a remote-coupled, i.e., far from the engine, position, i.e., at a distance of more than 100 cm exhaust gas flow length from exhaust 12 of the internal combustion engine.

Additionally disposed in exhaust system 20, there may be further catalytic converters, in particular a further three-way catalytic converter, a NOx storage catalytic converter or a catalytic converter for selectively catalytically reducing nitrogen oxides. Located upstream of particulate filter 24 in exhaust duct 22 is a first lambda probe 50 for determining oxygen content Xi of the exhaust gas downstream of exhaust 12 and upstream of the first exhaust gas aftertreatment component, thus of particulate filter 24. Disposed in exhaust duct 22 downstream of electrically heatable three-way catalytic converter 26 and upstream of further three-way catalytic converter 28 is a second lambda probe 52, which may be used for determining oxygen content $\lambda_2$ in exhaust duct 28 downstream of electrically heatable three-way catalytic converter 26 and upstream of further three-way catalytic converter 28. First lambda probe 50 is preferably in the form of a broadband lambda probe and communicates via a first signal line 58 with a control unit 56 of internal combustion engine 10. Second lambda probe 52 is preferably in the form of a step change probe and communicates via a second signal line 60 with control unit 56. First lambda probe 50 and second lambda probe 52 thereby form a sensor assembly for regulating air/fuel ratio k of internal combustion engine 10. In addition, the sensor assembly may perform an on-board diagnosis of electrically heatable catalytic converter 26.

Figure 2:
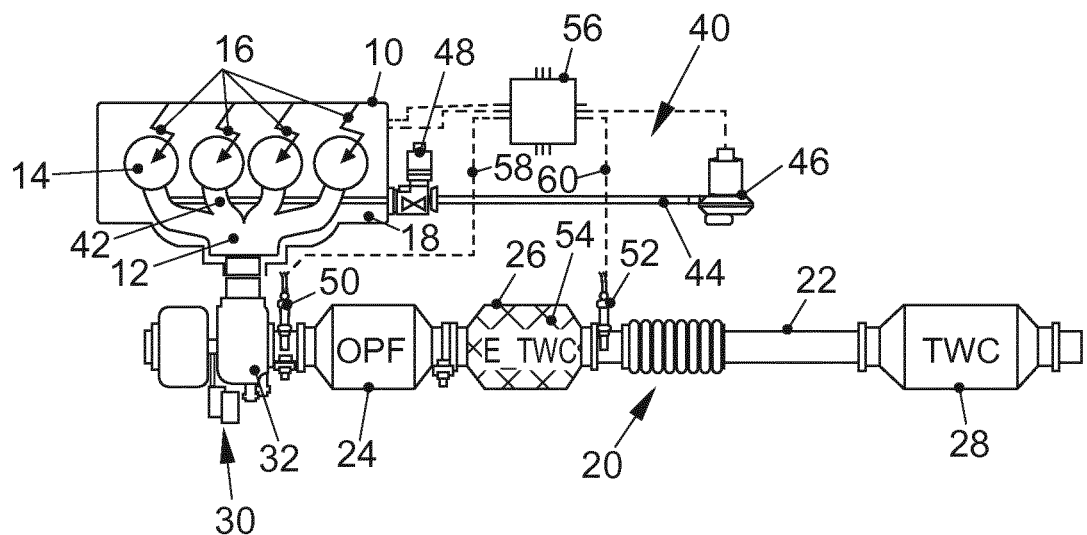
FIG. 2 shows another exemplary embodiment of an internal combustion engine having an exhaust gas aftertreatment system according to the present invention, the exhaust gas aftertreatment system additionally having a secondary air system for introducing fresh air into the exhaust system.

Electrically heatable three-way catalytic converter 26 has an electrical heating element 34, in particular an electrical heating disk, as well as a metallic substrate structure 36. A pin connection 38 is used to attach electrical heating element 34 to the metallic substrate structure, making it possible to permanently mechanically fix electrical heating element 34. Alternatively, electrically heatable three-way catalytic converter 26, as shown in FIG. 2, may also feature an electrically heatable substrate 54. Also provided upstream and downstream of particulate filter 24 are pressure sensors, which may be used to perform a differential pressure measurement via particulate filter 24 to determine the saturation condition of particulate filter 24. Moreover, the pressure sensors may be used to perform an on-board diagnosis of particulate filter 24.

FIG. 2 shows another exemplary embodiment of an internal combustion engine having an exhaust gas aftertreatment system. The exhaust gas aftertreatment system additionally has a secondary air system 40 in essentially the same design as in FIG. 1. Secondary air system 40 includes a secondary air pump 46, a secondary air conduit 44, as well as a secondary air valve 48 located in secondary air conduit 44 downstream of secondary air pump 46 and upstream of a feed point 42. Feed point 42 is formed in an exhaust-side cylinder head 18 of internal combustion engine 10 to be able to introduce secondary air into a hottest possible exhaust gas and thus promote exothermic reactions with unburned fuel components. Alternatively, feed point 42 may also be configured at locations upstream of particulate filter 24, making it possible for particulate filter 24 and three-way catalytic converters 26, 28 disposed downstream of particulate filter 24 to be supplied with secondary air. Electrically heatable three-way catalytic converter 26 features an electrically heatable substrate, which may be used to generate heat directly at the catalytically active structure of electrically heatable catalytic converter 26. Alternatively, as illustrated in FIG. 1, electrically heatable catalytic converter 26 may also feature an electrical heating element 34 and a metallic substrate structure 36.

During operation of internal combustion engine 10, the exhaust gas from the internal combustion engine is directed through particulate filter 24, electrically heatable three-way catalytic converter 26, as well as through further three-way catalytic converter 28; the soot particles contained in the exhaust gas being filtered out of the exhaust-gas flow, and the harmful exhaust-gas components being converted into harmless exhaust-gas components. The close-coupled configuration of particulate filter 24 and of electrically heatable three-way catalytic converter 26 allows an especially rapid heating to a light-off temperature following a cold start of internal combustion engine 10 to make possible a rapid, efficient conversion of the gaseous pollutants following the cold start. In this context, particulate filter 24 is preferably uncoated, in particular does not have a coating having an oxygen storage capacity. This makes it possible to use lambda probes 50, 52 to diagnose electrically heatable catalytic converter 26. By configuring particulate filter 24 as the first component of the exhaust gas aftertreatment, electrically heatable catalytic converter 26 is loaded to a lesser extent during a full-load operation of the internal combustion engine, thereby making it possible to reduce the ageing of the catalytic coating.

Figure 3:
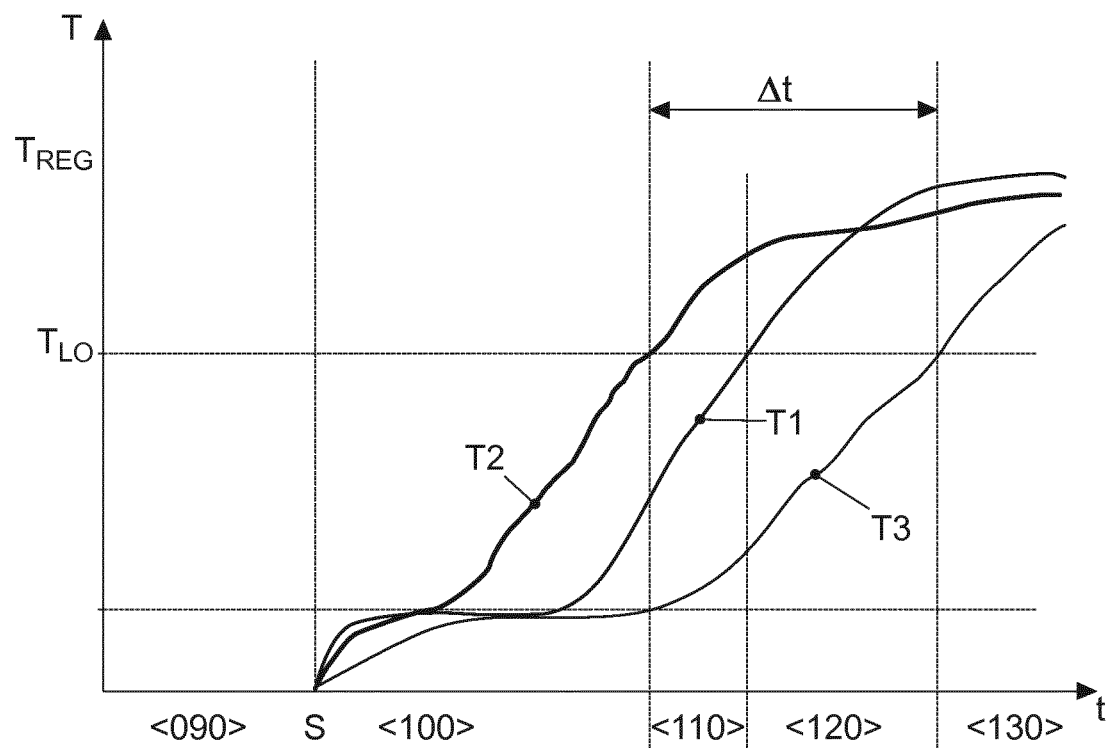
FIG. 3 is a diagram showing the temperature profile in the exhaust system upon implementation of an exhaust gas aftertreatment method according to the present invention.

FIG. 3 illustrates the temperature profile at a plurality of locations of exhaust system 20 during execution of an exhaust gas aftertreatment method according to the present invention. In a first curve I, temperature T1 is thereby shown directly downstream of particulate filter 24. In second curve II, temperature T2 in electrically heatable three-way catalytic converter 26 is shown in the case of activated electrical heating element 34. To that end, temperature T2 at the component middle of electrically heatable three-way catalytic converter component 26 is determined. Internal combustion engine 10 is thereby started at a starting instant S, and electrical heating element 34 simultaneously begins to be electrically heated. In a first phase <100>, particulate filter 24 and electrically heatable catalytic converter 26 are traversed by the flow of the exhaust gas from internal combustion engine 10 and heated by the same. In parallel thereto, electrically heatable catalytic converter 26 is heated by electrical heating element 34, the heat being essentially convectively transferred by the exhaust-gas flow of internal combustion engine 10 from heating element 34 to metallic substrate structure 36. If electrically heatable catalytic converter 26 has reached light-off temperature $T_{LO}$ thereof, electrically heatable three-way catalytic converter 26 undergoes a combined heating, an electrical heating and a chemical heating, in a second phase <110>, since, from this point in time on, the unburned exhaust components may be converted exothermally on the catalytic surface of electrically heatable three-way catalytic converter 26. If electrically heatable three-way catalytic converter 26 has reached the operating temperature thereof, electrical heating element 34 is switched off. In a third phase <120>, the electrical heating of electrically heatable three-way catalytic converter component 26 is stopped, and the temperature is maintained by the exothermic reactions of the unburned fuel components on the catalytically active surface of electrically heatable three-way catalytic converter 26. In a fourth operating phase <130>, both electrically heatable three-way catalytic converter 26 and particulate filter 24 have reached a temperature at which no further heating measures are needed. As a comparison, temperature T3 of electrically heatable three-way catalytic converter 26 is shown in the third curve when electrical heating element 34 is not activated in any of phases <100>, <110> or <120>.

A substrate flow for heat transfer may be produced by a secondary air system 40, whereby heating of electrically heatable three-way catalytic converter 24 may already be begun in a pre-start phase <90>, enabling light-off temperature $T_{LO}$ to be reached even faster following start S of internal combustion engine 10.

REFERENCE NUMERAL LIST 10 internal combustion engine
12 exhaust
14 combustion chamber
16 spark plug
18 cylinder head
20 exhaust system
22 exhaust duct
24 particulate filter
26 electrically heatable three-way catalytic converter
28 three-way catalytic converter
30 exhaust-gas turbocharger
32 turbine
34 electrical heating element/electrical heating disk
36 metallic substrate structure
38 pin connection
40 secondary air system
42 feed point
44 secondary air conduit
46 secondary air pump
48 secondary air valve
50 first lambda probe/wide band lambda probe
52 second lambda probe/step change probe
54 electrically heatable substrate
56 control unit
58 signal line
60 signal line
<90> pre-start phase
<100> start phase of the internal combustion engine
<110> second phase
<120> third phase
<130> fourth phase
S start of the internal combustion engine
T temperature
T1 temperature
T2 temperature of the electrically heatable three-way catalytic converter in the case of an active heating element
T3 temperature of the electrically heatable three-way catalytic converter in the case of a deactivated heating element
$T_{LO}$ light-off temperature of electrically heatable catalytic converter
$T_{REG}$ regeneration temperature of the particulate filter

What is claimed is:

1. An exhaust gas aftertreatment system for an internal combustion engine comprising:
   an exhaust system that is couplable to an exhaust outlet port of the internal combustion engine, the exhaust system including an exhaust duct, in which are disposed in a flow direction of an exhaust gas of the internal combustion engine through the exhaust duct:

a particulate filter, which is uncoated and is free of an oxygen accumulator, as a first emission-reducing component, in a close-coupled configuration;

downstream of the particulate filter, likewise in a close-coupled position, an electrically heatable three-way catalytic converter;

downstream of the electrically heatable catalytic converter, a further three-way catalytic converter, and a turbine of an exhaust-gas turbocharger configured in the exhaust duct downstream of the exhaust outlet port and upstream of the particulate filter.

2. The exhaust gas aftertreatment system as recited in claim 1, wherein the internal combustion engine has a secondary air system for introducing secondary air into the exhaust duct, a feed point of the secondary air system being located at the exhaust outlet port of the internal combustion engine or downstream thereof and upstream of the particulate filter.

3. The exhaust gas aftertreatment system as recited in claim 1, wherein the electrically heatable three-way catalytic converter has an electrical heating element and a metallic substrate structure.

4. The exhaust gas aftertreatment system as recited in claim 3, wherein a pin connection attaches the electrical heating element to the metallic substrate structure of the electrically heatable three-way catalytic converter.

5. The exhaust gas aftertreatment system as recited in claim 1, wherein the electrically heatable three-way catalytic converter has an electrically directly heatable substrate.

6. The exhaust gas aftertreatment system as recited in claim 1, further comprising a first lambda probe disposed upstream of the particulate filter, and a second lambda probe in the exhaust duct is disposed downstream of the electrically heatable catalytic converter and upstream of the further three-way catalytic converter.

7. A method for the exhaust gas aftertreatment of the internal combustion engine using the exhaust gas aftertreatment system according to claim 1, comprising the following steps:

electrically heating the electrically heatable three-way catalytic converter to a light-off temperature of the electrically heatable three-way catalytic converter at a start of the internal combustion engine; and heating the particulate filter, the electrically heatable three-way catalytic converter and the further three-way catalytic converter using an exhaust-gas flow from the internal combustion engine, beginning from the start of the internal combustion engine.

8. The method for the exhaust gas aftertreatment as recited in claim 7, wherein secondary air is introduced into the exhaust-side cylinder head or into the exhaust duct downstream of the exhaust and upstream of the particulate filter in a heating phase of one of the three-way catalytic converters or of the particulate filter, to promote the heating of the three-way catalytic converters or of the particulate filter by an exothermic reaction of unburned fuel components.

* * * * *